United States Patent
Li et al.

(10) Patent No.: US 6,944,691 B1
(45) Date of Patent: Sep. 13, 2005

(54) ARCHITECTURE THAT CONVERTS A HALF-DUPLEX BUS TO A FULL-DUPLEX BUS WHILE KEEPING THE BANDWIDTH OF THE BUS CONSTANT

(75) Inventors: Gabriel Li, San Francisco, CA (US); Edward L. Grivna, Brooklyn Park, MN (US)

(73) Assignee: Cypress Semiconductor Corp., San Jose, CA (US)

( * ) Notice: Subject to any disclaimer, the term of this patent is extended or adjusted under 35 U.S.C. 154(b) by 688 days.

(21) Appl. No.: 09/915,794

(22) Filed: Jul. 26, 2001

(51) Int. Cl.⁷ .............................................. G06F 13/42
(52) U.S. Cl. ..................................... 710/106; 710/305
(58) Field of Search ................................. 710/105, 106, 710/305; 370/319–321, 326, 335–337, 342–347, 441–442

(56) References Cited

U.S. PATENT DOCUMENTS

| | | | | |
|---|---|---|---|---|
| 3,823,401 A | * | 7/1974 | Berg et al. ................... | 370/280 |
| 4,488,293 A | * | 12/1984 | Haussmann et al. ........ | 370/535 |
| 4,564,899 A | * | 1/1986 | Holly et al. ................. | 710/104 |
| 6,226,296 B1 | * | 5/2001 | Lindsey et al. ............. | 370/401 |
| 6,272,130 B1 | * | 8/2001 | Panahi et al. ............... | 370/366 |
| 6,614,796 B1 | * | 9/2003 | Black et al. ................. | 370/403 |
| 2002/0145787 A1 | * | 10/2002 | Shpantzer et al. .......... | 359/136 |
| 2002/0154610 A1 | * | 10/2002 | Tiedemann et al. ......... | 370/329 |
| 2002/0186435 A1 | * | 12/2002 | Shpantzer et al. .......... | 359/136 |

FOREIGN PATENT DOCUMENTS

| | | | | |
|---|---|---|---|---|
| EP | 001107479 A2 | * | 6/2001 | ............ H04B/7/26 |

OTHER PUBLICATIONS

U.S. Appl. No. 09/822,979, filed Mar. 30, 2001, Abner Lerner, "Communication Protocol for the Broadcast of First/Last Event Detection Over a Single Communication Line".

U.S. Appl. No. 09/392,042, filed Sep. 8, 1999, Gabriel Li, "Circuitry, Architecture and Method(s) for Synchronizing Data".

U.S. Appl. No. 09/391,967, filed Sep. 8, 1999, Gabriel Li, "Circuitry, Architecture and Method(s) for Synchronizing Data".

U.S. Appl. No. 09/391,865, filed Sep. 8, 1999, Gabriel Li, "Circuitry, Architecture and Method(s) for Synchronizing Data".

(Continued)

Primary Examiner—Sumati Lefkowitz
(74) Attorney, Agent, or Firm—Christopher P. Maiorana, PC

(57) ABSTRACT

An architecture comprising a first circuit, a second circuit, and one or more pairs of communication channels. The first circuit may be configured to transmit one or more first serial streams in response to a plurality of first source data streams and recover a plurality of second source data streams from one or more second serial streams. The second circuit may be configured to transmit the one or more second serial streams in response to the plurality of second source data streams and recover the plurality of first source data streams in response to the one or more first serial streams. The first circuit and the second circuit may be coupled by the one or more pairs of communication channels. The first and second circuits may be configured to transmit simultaneously.

23 Claims, 4 Drawing Sheets

OTHER PUBLICATIONS

"HOTLink™ Transmitter/Receiver", Cypress Semiconductor Corporation, Apr. 5, 1999, pp. 1–35. Abner Lerner, "Communication Protocol for the Broadcast of First/Last Event Detection Over a Single Communication Line", U.S. Ser. No. 09/822,979, filed Mar. 30, 2001.

Gabriel Li, "Circuitry, Architecture and Method(s) for Synchronizing Data", U.S. Ser. No. 09/392,042, filed Sep. 8, 1999.

Gabriel Li, "Circuitry, Architecture and Method(s) for Synchronizing Data", U.S. Ser. No. 09/391,967, filed Sep. 8, 1999.

Gabriel Li, "Circuitry, Architecture and Method(s) for Synchronizing Data", U.S. Ser. No. 09/391,865, filed Sep. 8, 1999.

* cited by examiner

US 6,944,691 B1

ARCHITECTURE THAT CONVERTS A HALF-DUPLEX BUS TO A FULL-DUPLEX BUS WHILE KEEPING THE BANDWIDTH OF THE BUS CONSTANT

FIELD OF THE INVENTION

The present invention relates to a method and/or architecture for converting a half-duplex bus to a full-duplex bus generally and, more particularly, to converting a half-duplex bus to a full-duplex bus while maintaining a constant bandwidth.

BACKGROUND OF THE INVENTION

Referring to FIG. 1, a block diagram of a circuit 10 illustrating a half-duplex bus architecture is shown. The circuit includes a bi-directional bus with a plurality of half-duplex channels that only support half-duplex communication. The circuit 10 can connect a first circuit (card) 12 to a second circuit (card) 14. The circuits 12 and 14 can exchange data via transmission lines (pairs of wires) 16. Each pair of wires 16 can be used to transmit or receive data at a rate of 77.75 MB/s. At each end of 20 each pair of wires 16, an output buffer 18 and an input buffer 20 are connected together. Connecting the input buffer 20 and output buffer 18 together can result in a bus contention when the output buffers (transmitters) 18 at both ends of the transmission lines 16 are active. Depending on buffer (driver) type, additional circuits can be required to prevent the output buffers 18 from self-destructing. The addition of the input buffer 20 in parallel with the output buffer 18 can increase capacitance of the source and destination end of the transmission lines 16. The increased capacitance can affect the termination-impedance of the transmission lines 16.

The conventional half-duplex bus can have the following disadvantages: 1. bus contention during hot insertion of cards (e.g., both output buffers 18 of a channel 16 can be ON at the same time); 2. half-duplex operation (i.e., only one card can transmit at one time); 3. additional components can be required to prevent the destruction of the output buffers 18; 4. termination at both ends of the transmission line places increased load and current-drive requirements on the enabled output buffer 18; 5. bus turn-around can require phase lock loops (PLLs) to re-acquire lock, therefore, slowing data exchange.

A conventional method for providing a full-duplex bi-directional bus is to a use a hybrid network to allow simultaneous bi-directional transmission of data across the same pair of wires. The drawback to a hybrid circuit is that the hybrid networks can require echo cancellation circuits which can require a 6 dB or better signal to noise ratio (SNR). The hybrid circuit can also require receivers with greater sensitivity or larger source amplitude for valid transmission. The greater sensitivity and large source amplitude can result in greater power dissipation, higher complexity, and possibly greater radiated emissions.

SUMMARY OF THE INVENTION

The present invention concerns an architecture comprising a first circuit, a second circuit, and one or more pairs of communication channels. The first circuit may be configured to transmit one or more first serial streams in response to a plurality of first source data streams and recover a plurality of second source data streams from one or more second serial streams. The second circuit may be configured to transmit the one or more second serial streams in response to the plurality of second source data streams and recover the plurality of first source data streams in response to the one or more first serial streams. The first circuit and the second circuit may be coupled.by the one or more pairs of communication channels. The first and second circuits may be configured to transmit simultaneously.

The objects, features and advantages of the present invention include providing an architecture that converts a half-duplex bus into a full-duplex bus that may (i) convert a bus architecture comprising a plurality of half-duplex channels into a full-duplex bus comprising a plurality of simplex channels; (ii) double the throughput of the bus while maintaining a constant bus bandwidth; and/or (iii) reduce the number of physical channels by interleaving three or more data character streams and multiplying the channel speed.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
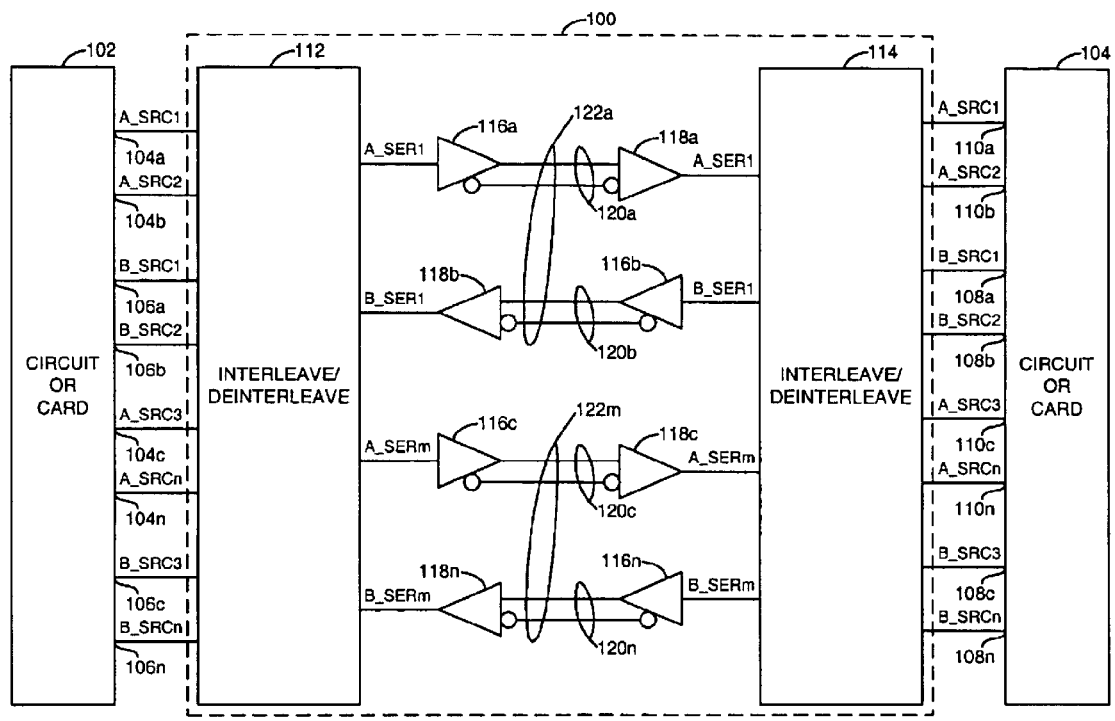
FIG. 2 is a block diagram of a preferred embodiment of the present invention.

Referring to FIG. 2, a block diagram of a circuit 100 is shown illustrating a preferred embodiment of the present invention. The circuit 100 may be implemented as a full-duplex bus comprising a plurality of simplex channels. In one example, the circuit 100 may be implemented as part of a backplane or motherboard of a computer, controller, or other device. Alternatively, the circuit 100 may be implemented as part of a network. The circuit 100 may be configured to communicate a number of source data streams (e.g., A_SRC1-A_SRCN, where N is an integer) from a circuit (host) 102 to a circuit (host) 104 and a number of source data streams (e.g., B_SRC1-B_SRCN, where N is an integer) from the circuit 104 to the circuit 102. The circuits 102 and 104 may be implemented, in one example, as peripheral devices (e.g., cards). In one example, the source data streams may have a data rate of 77.75 MB/s. However, other data rates may be implemented accordingly to meet the design criteria of a particular application. The source data streams may be implemented as character (parallel data) streams.

The circuit 100 may comprise a circuit 112, a circuit 114, a number of transmitters 116, and a number of receivers 118. The circuits 112 and 114 may be implemented as interleaving/de-interleaving (multiplexing/de-multiplexing) circuits. The circuits 112 and 114 may be configured to (i) generate one or more serial streams (e.g., A_SER1-A_SERM or B_SER1-B_SERM, where M is an integer) by interleaving, encoding, and/or serializing the number of source data streams A_SRC1-A_SRCN or B_SRC1-B_

SRCN and (ii) recover the source data streams A_SRC1-A_SRCN and B_SRC1-B_SRCN by de-interleaving, decoding, and/or de-serializing the one or more serial streams A_SER1-A_SERM and B_SER1-B_SERM, respectively. The value M may be less than or equal to the value N. For example, M may equal N when no interleaving is desired. The serial streams generally have a data rate that is a multiple of the data rate of the source data streams. The multiplier is generally a product of the interleave ratio and a parallel-to-serial conversion ratio. In one example, the serial streams may have a signaling rate of 1555 MBd when the source data streams have a data rate of 77.75 MB/s, the interleave ratio is 2:1, and the parallel-to-serial conversion ratio is 10.

Each of the transmitters 116 may be connected to a receiver 118 by a simplex serial channel 120. The simplex serial channel 120 may be implemented, in one example, as a pair of wires. Alternatively, the simplex serial channel 120 may be implemented using fiberoptic, coaxial, twisted pair, microstrip, stripline, or other appropriate transmission line technology. In one example, a full-duplex bus 122 may be implemented by pairing two of the simplex serial channels 120.

The circuit 102 may have a number of outputs 104a–104n that may present the source data streams A_SRC1-A SRCN and a number of inputs 106a–106n that may receive the source data streams B_SRC1-B_SRCN. The circuit 104 may have a number of outputs 108a108n that may present the source data streams B_SRC1-B_SRCN and a number of inputs 110a–110n that may receive the source data streams A_SRC1-A_SRCN.

The circuit 112 may have a number of outputs that may present each of the signals A_SER1-A_SERM to an input of a transmitter 116. The transmitters 116 may transmit the signals A_SER1-A_SERM to respective receivers 118. The receivers 118 may present the signals A_SER1-A_SERM to a respective input of the circuit 114. The circuit 114 may have a number of outputs that may present each of the signals B_SER1-B_SERM to an input of a respective transmitter 116. The transmitters 116 may communicate the signals B_SER1-B_SERM to respective receivers 118. The receivers 118 may present the signals B_SER1-B_SERM to inputs of the circuit 112.

The circuits 112 and 114 may be configured to interleave a number of source data (character) streams to generate one or more serial streams and de-interleave the one or more serial streams to recover the number of source data (character) streams. In one example, the circuits 112 and 114 may be configured to receive a plurality of serial streams. The serial streams may be skewed by delay variations between the serial channels (links) 120. The circuits 112 and 114 may be configured to (i) deserialize and decode the received serial streams back into interleaved data (character) streams and (ii) bond the interleaved data (character) streams to align the data (characters) before de-interleaving.

As used herein, bonding generally refers to an operation bringing two (or more) streams of data, where all streams operate at the exact same character (or serial) rate but are received in arbitrary phase relative to each other, into a common phase alignment. Bonding (or operating with bonded channels) allows multiple links to operate as a single link. A bonding operation generally begins by detecting a specific event or events at the receive end of the links that was generated at the transmit end of each link when the streams were in the desired alignment. The event detected may be, for example, a specific character or sequence of characters (e.g., for links using character based framing) or a distributed marker that may be found repetitively at predetermined locations within each data stream. When the specific event or events is detected, the streams at the receive end may be re-aligned to the desired alignment. An example of channel bonding may be found in the co-pending application, U.S. Ser. No. 09/822,979, which is hereby incorporated by reference in its entirety.

Figure 1:
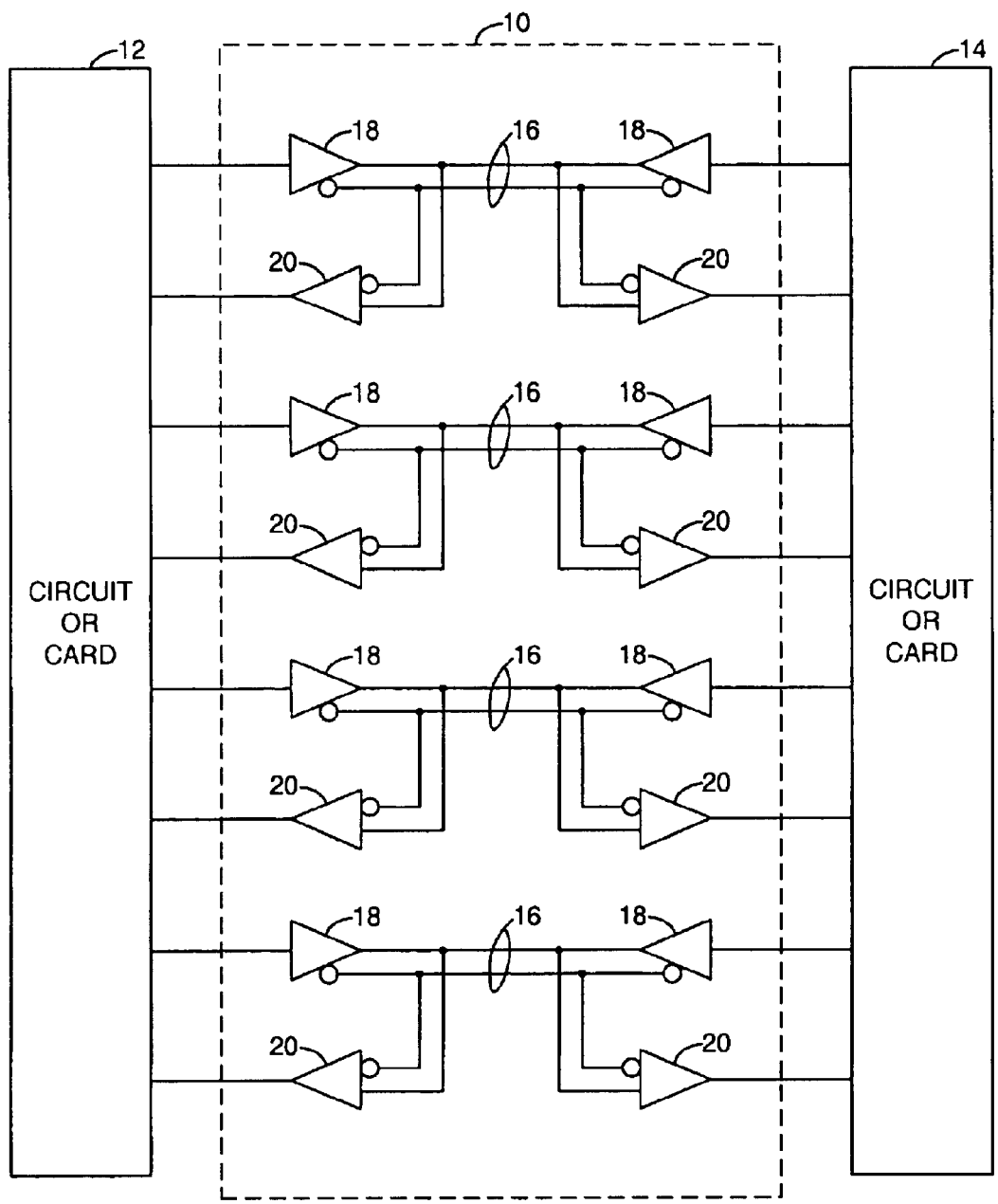
FIG. 1 is a block diagram of a half-duplex bus design.

Each end of the full-duplex bus formed by the serial links 120 may have, in one example, two transmitters 116 and two receivers 118. However, other numbers of transmitters and receivers may be implemented to meet the design criteria of a particular application. Both transmitters 116 may be transmitting all of the time at a signaling rate that is, in one example, twenty times the data rate of the source data (character) streams (e.g., the signaling rate of the transmitters 116 may be 1555 MBd when the source data rate is 77.75 MB/s, the interleave ratio is 2:1 and the parallel-to-serial conversion ratio is 10). To maintain the four distinct channels found in the architecture shown in FIG. 1, the circuits 112 and 114 may be configured to interleave two source character streams (e.g., A_SRC1 with A_SRC2, A SRC3 with A_SRCN, B_SRC1 with B_SRC2, and B_SRC3 with B_SRCN) into a single interleaved data stream for transmission as a serial stream (e.g., A_SER1, A_SERM, B_SER1, and B_SERM, respectively) with a signaling rate that is, in one example, twenty times that of the parallel interface character-rate clock. At the receive end of the serial channels 120, the serial streams may be converted back to interleaved data streams that may be aligned to a common time reference by the bonding process. When the interleaved data streams are bonded, the characters in each channel may be de-interleaved back into the respective source data (character) streams (e.g., A_SRC1-A_SRCN and B_SRC1-B_SRCN).

Figure 3:
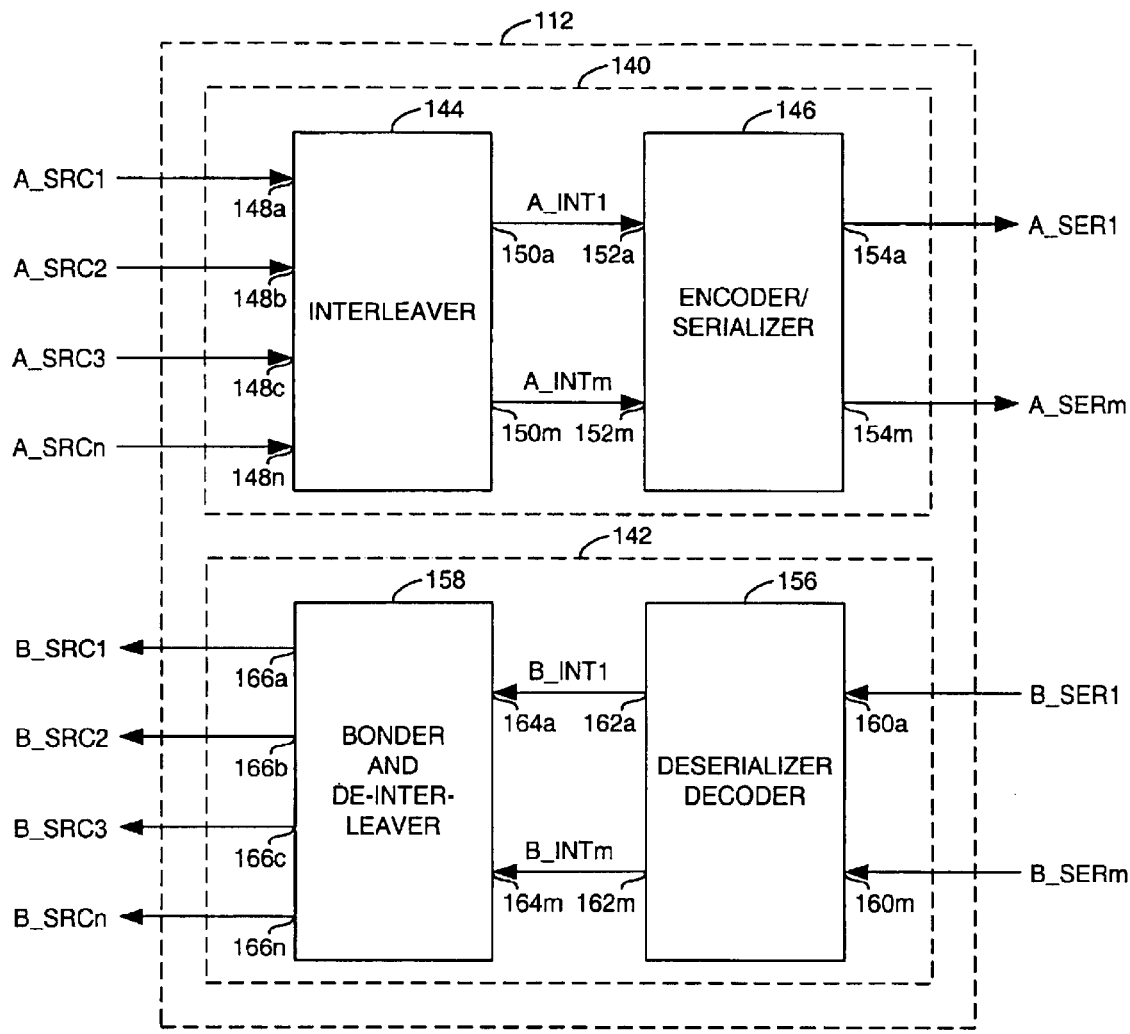
FIG. 3 is a detailed block diagram of the circuit of FIG. 2.

Referring to FIG. 3, a block diagram of the circuit 112 of FIG. 2 is shown. The circuit 112 and the circuit 114 may be implemented similarly. As such, only the circuit 112 is described for brevity. The circuit 112 may comprise a circuit 140 and a circuit 142. The circuit 140 may be configured to generate the serial streams A_SER1-A_SERM in response to the source data streams A_SRC1-A_SRCN. The number of source data streams N may be larger than or equal to the number of serial streams M. In one example, N may be an integer multiple of M. The circuit 142 may be configured to recover a number of source data streams from one or more serial streams. For example, the circuit 142 may recover the source data streams B_SRC1-B_SCRN from the serial streams B_SER1-B_SERM.

The circuit 140 may comprise a circuit 144 and a circuit 146. The circuit 144 may be implemented as an interleaver circuit. The circuit 146 may be implemented as an encoder and serializer circuit. The signals A_SRC1-A_SRCN may be presented to a number of inputs 148a–148n of the circuit 144. The circuit 144 may have a number of outputs 150a–150m that may present a number of interleaved data (character) streams (e.g., A_INT1_A_INTM) to a number of inputs 152a–152m of the circuit 146. Each of the signals A_INT1-A_INTM may be generated by interleaving (multiplexing) data from two or more source data streams. In one example, two source data streams may be interleaved to form one interleaved data stream. The circuit 146 may have a number of outputs 154a–154m that may present the signals (serial data streams) A_SER1-A_SERM. The signals A_SER1-A_SERM may be generated by encoding and serializing the signals A_INT1-A_INTM, respectively. Alternatively, a number of source data streams (e.g., 4) may be interleaved, encoded, and serialized into a single serial stream. Each of the serial streams generally has a signaling rate that is the source data stream data rate multiplied by the number of source streams interleaved (e.g., 2) and the parallel-to-serial conversion ratio (e.g., 10).

The circuit 142 may comprise a circuit 156 and a circuit 158. The circuit 156 may be implemented as a deserializer and decoder circuit. The circuit 158 may be implemented as a bonding and de-interleaving circuit. The circuit 156 may have a number of inputs 160a–160m that may receive the signals B_SER1-B_SERM and a number of outputs 162a–162m that may present a number of signals (e.g., B_INT1-B_INTM) to a number of inputs 164a–164m of the circuit 158. The signals B_INT1-B_INTM may comprise deserialized and decoded interleaved character (data) streams recovered from the serial streams B_SER1-B_SERM. The signals $B\_{INT1-B}\_INTM$ may be skewed from one another due to variance in delays in the respective serial channels.

The circuit 158 may be configured to deskew the signals B_INT1-B_INTM by bonding (aligning) the signals B_INT1-B_INTM to a clock extracted (recovered) from one of the received data streams (e.g., a recovered clock) or to common reference clock. When the signals B_INT1-B_INTM are deskewed, the circuit 158 may be configured to recover (de-interleave) the source data streams (e.g., B_SRC1-B_SRCN) contained within the signals B_INT1-B_INTM. The circuit 158 may have a number of outputs 166a–166n that may present the signals (source data streams) B_SRC1-B_SRCN.

Figure 4:
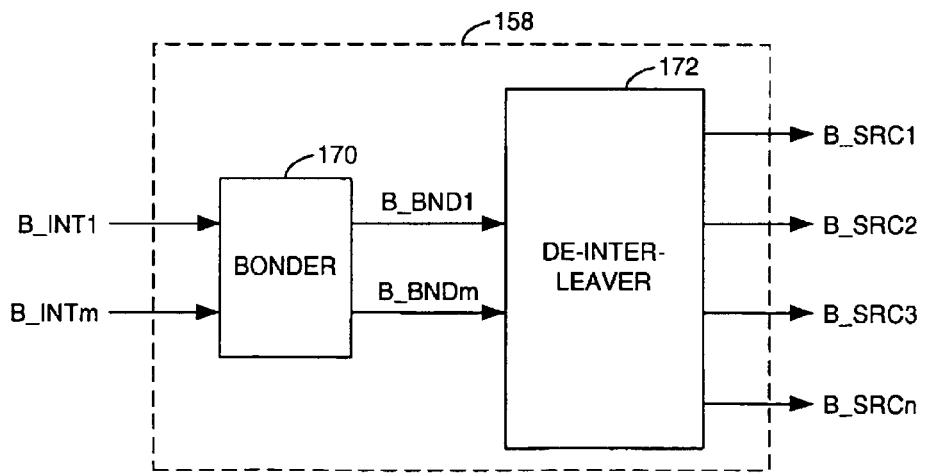
FIG. 4 is a more detailed block diagram of the circuit of FIG. 3.

Referring to FIG. 4, a detailed block diagram of the circuit 158 is shown. The circuit 158 may be implemented as a bonding and de-interleaving circuit. The circuit 158 may comprise a circuit 170 and a circuit 172. The circuit 170 may be implemented as a bonding circuit. The circuit 172 may be implemented as a de-interleaver circuit. The signals B_INT1-B_INTM may be presented to inputs of the circuit 170. The circuit 170 may be configured to generate a number of signals B_BND1-B_BNDM in response to the signals B_INT1-B_INTM. The signals B_BND1-B_BNDM may represent bonded (aligned) character streams recovered from the signals B_INT1-B_NTM. The circuit 170 may have a number of outputs that may present the signals B_BND1-B_BNDM to a number of inputs of the circuit 172. The circuit 172 may be configured to de-interleave the bonded interleaved character streams B_BND1-B_BNDM to recover the source data streams B_SRC1-B_SRCN. The circuit 172 may have a number of outputs that may present the source data streams B_SRC1-B_SRCN.

Figure 5:
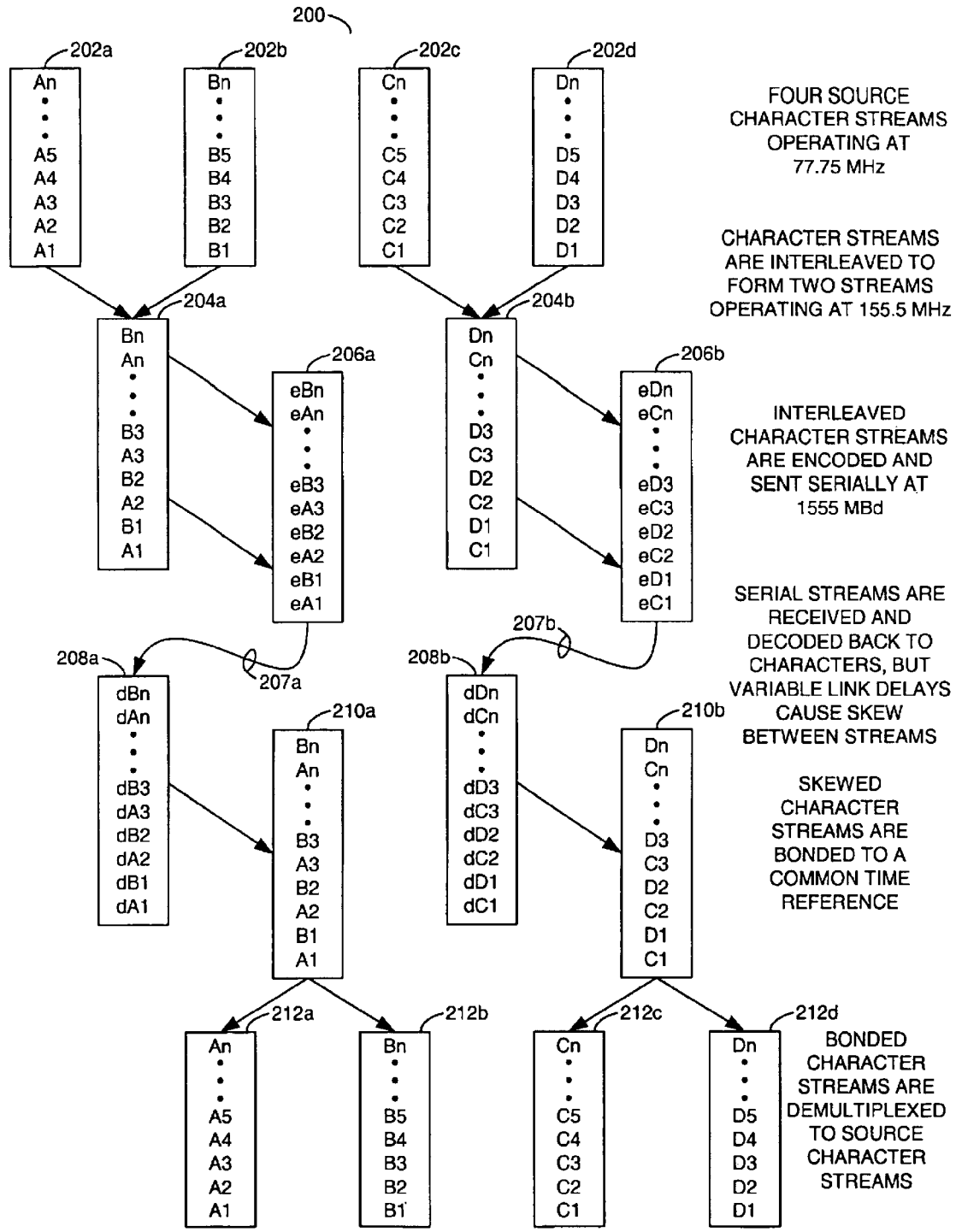
FIG. 5 is a block diagram illustrating an example operation of the present invention.

Referring to FIG. 5, a block diagram illustrating an example operation of the present invention is shown. In one example, the circuit 100 may be configured to communicate four source character streams operating at a rate of 77.75 MB/s (e.g., the blocks 202a–202d). The circuit 100 may interleave (multiplex) the four source character streams, in one example, into two interleaved character streams (e.g., the blocks 204a and 204b). The interleaved character streams may be encoded and serialized (e.g., the blocks 206a and 206b) and transmitted via serial channels (e.g., fiber, coax, twisted pair, etc.) at a rate of 1555 MBd (e.g., the links 207a and 207b). The serial streams may be received, deserialized, and decoded back to interleaved character streams (e.g., the blocks 208a and 208b). However, the serial streams may be skewed due to different delays in the Links 207a and 207b. The interleaved character streams may be bonded to a common time reference (e.g., the blocks 210a and 210b). When the interleaved character streams are bonded to the common time reference, the interleaved character streams may be de-interleaved (de-multiplexed) to recover the original source character streams (e.g., the blocks 212a–212d).

Figure 6:
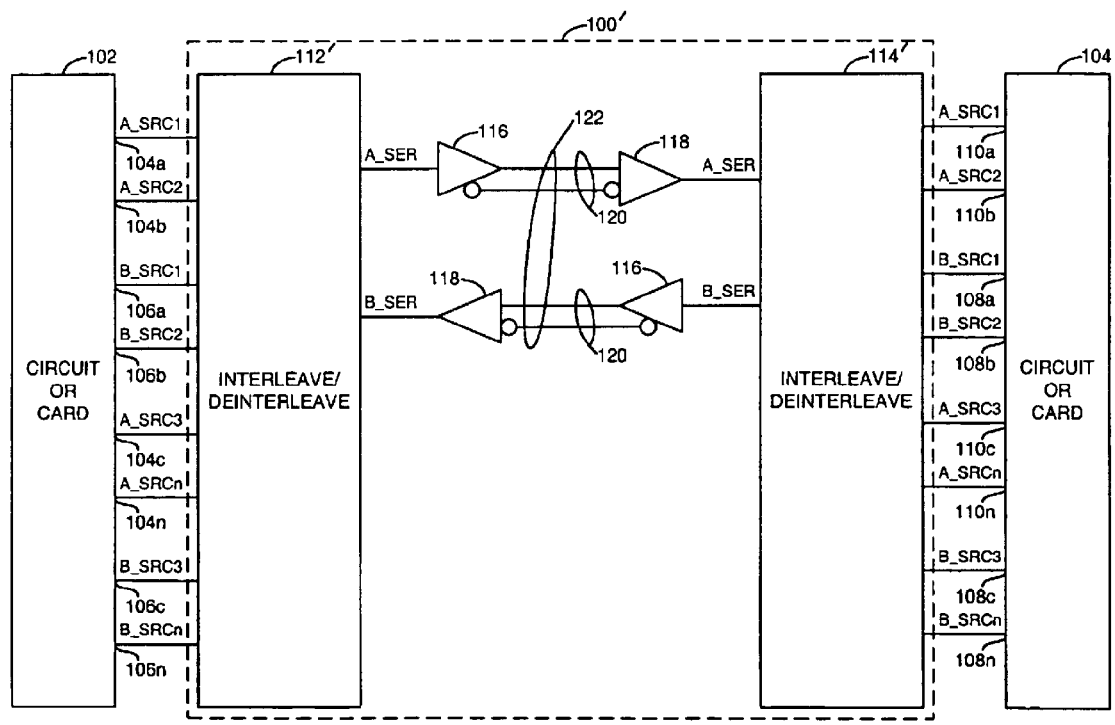
FIG. 6 is a block diagram of an alternative embodiment of the present invention.

Referring to FIG. 6, a block diagram of a circuit 100' illustrating an alternate embodiment of the present invention is shown. In an alternative example, a 4:1 interleaving ratio may allow a single serial channel to communicate all of the source streams. Four-to-one interleavers 112' and 114' may be implemented to reduce the number of serial channels to one channel in each direction. Reducing the number of serial channels may reduce the cost of a communication system. However, when higher interleave ratios are implemented, the signaling rate of the serial interface may limit the length of an interconnect (e.g., a copper interconnect).

While the invention has been particularly shown and described with reference to the preferred embodiments thereof, it will be understood by those skilled in the art that various changes in form and details may be made without departing from the spirit and scope of the invention.

What is claimed is:

1. An architecture comprising:
   a first circuit configured to (i) transmit one or more first serial streams in response to a plurality of first source data streams and (ii) recover a plurality of second source data streams in response to one or more second serial streams;
   a second circuit configured to (i) transmit said one or more second serial streams in response to said plurality of second source data streams and (ii) recover said plurality of first source data streams in response to said one or more first serial streams; and
   one or more pairs of communication channels coupling said first circuit and said second circuit, wherein (i) each of said first and second serial streams comprise interleaved data from said first and second source data streams, respectively and (ii) said first and second circuits are configured to transmit simultaneously.

2. The architecture according to claim 1, wherein:
   said first circuit is further configured to transmit via a first communication channel of each of said one or more pairs of communication channels; and
   said second circuit is further configured to transmit via a second communication channel of each of said one or more pairs of communication channels.

3. The architecture according to claim 2, wherein the number of serial streams is less than the number of source streams.

4. The architecture according to claim 1, wherein said serial streams have a signaling rate that is an integer multiple of a data rate of said source data streams.

5. The architecture according to claim 1, wherein each of said communication channels comprises a simplex serial link comprising a transmission line selected from the group consisting of a fiber optic cable, a coaxial cable, a twisted pair cable, a microstrip transmission line, a stripline transmission line, and any other transmission line configured to carry said serial stream.

6. The apparatus according to claim 1, wherein:
   said first and second circuits are further configured to convert said one or more pairs of communication channels from half-duplex operation to full-duplex operation while maintaining a bandwidth of said one or more pairs of communication channels.

7. An apparatus comprising:
   a first circuit configured to generate one or more first interleaved streams in response to a plurality of first source data streams; and a second circuit configured to recover a plurality of second source data streams in response to one or more second interleaved data streams.

8. The apparatus according to claim 7, wherein said one or more first interleaved data streams are carried by a first communication channel of each of one or more pairs of communication channels.

9. The apparatus according to claim 8, wherein said one or more second interleaved data streams are carried by a second communication channel of each of said one or more pairs of communication channels.

10. The apparatus according to claim 7, wherein said first circuit comprises an interleaver circuit configured to multiplex said plurality of first source data streams into said one or more first interleaved data streams.

11. The apparatus according to claim 7, wherein said second circuit comprises a bonding circuit configured to generate one or more bonded (aligned) data streams from said one or more second interleaved data streams.

12. The apparatus according to claim 11, wherein said second circuit further comprises a de-interleaver circuit configured to demultiplex said plurality of second source data streams from said one or more bonded data streams.

13. The apparatus according to claim 7, wherein said serial streams have a signaling rate that is an integer multiple of a data rate of said source data streams.

14. The apparatus according to claim 13, wherein said integer multiple is equal to the product of a number of source data streams carried by an interleaved data stream and a parallel-to-serial conversion ratio used to generate said serial stream from said interleaved data stream.

15. The apparatus according to claim 7, wherein each of said one or more serial streams are carried by a communication channel comprising one or more simplex serial links comprising a transmission line selected from the group consisting of a fiber optic cable, a coaxial cable, a twisted pair cable, a microstrip transmission line, a stripline transmission line, and any other transmission line configured to carry said serial stream.

16. A method for multiplying a throughput of one or more pairs of communication channels comprising the steps of:

(A) communicating a plurality of first source data streams from a first host to a second host as one or more first interleaved data streams via a first communication channel of each of said one or more pairs of communication channels; and (B) communicating a plurality of second source data streams from said second host to said first host as one or more second interleaved data streams via a second communication channel of each of said one or more pairs of communication channels.

17. The method according to claim 16, wherein the step A and the step B are performed simultaneously.

18. The method according to claim 16, wherein the step A comprises the sub-steps of:

generating one or more first serial streams in response to said plurality of first source data streams; and recovering said plurality of first source data streams from said one or more first serial streams.

19. The method according to claim 16, wherein the step B comprises the sub-steps of:

generating one or more second serial streams in response to said plurality of second source data streams; and recovering said plurality of second source data streams from said one or more second serial streams.

20. The method according to claim 16, wherein said interleaved data streams are serialized to generate serial streams.

21. The method according to claim 20, wherein said source data streams are recovered by deserializing, bonding and de-interleaving said serial streams.

22. The method according to claim 16, further comprising the step of:

converting said one or more pairs of communication channels from half-duplex operation at a first rate to full-duplex operation at a second rate, wherein said second rate is set to maintain a bandwidth of said one or more pairs of communication channels at said first rate.

23. The apparatus according to claim 6, wherein:

said first and second circuits are further configured to connect to said one or more pairs of communication channels in place of input and output buffers arranged as bi-directional bus drivers.

* * * * *